(No Model.)

O. McVEY & G. W. ALBIN.
CULTIVATOR ATTACHMENT.

No. 274,132. Patented Mar. 20, 1883.

Witnesses:
J. W. Reynolds, Jr.
D. Bernhard

Inventor
Owen McVey and
George W. Albin
per Edson Bros.
Attys

UNITED STATES PATENT OFFICE.

OWEN McVEY AND GEORGE W. ALBIN, OF NEOGA, ILLINOIS.

CULTIVATOR ATTACHMENT.

SPECIFICATION forming part of Letters Patent No. 274,132, dated March 20, 1883.

Application filed December 15, 1882. (No model.)

*To all whom it may concern:*

Be it known that we, OWEN McVEY and GEORGE W. ALBIN, citizens of the United States of America, residing at Neoga, in the county of Cumberland and State of Illinois, have invented certain new and useful Improvements in Cultivators of Small Corn, of which the following is a specification, reference being had therein to the accompanying drawings.

This invention relates to plow attachments for throwing dirt away from the corn while being cultivated when small; and it consists in the employment of an adjustable clasp or deflector adapted to be arranged obliquely on the plow-shovel, with its lower end disposed toward or next the young corn, substantially as hereinafter more fully set forth.

Figure 1:
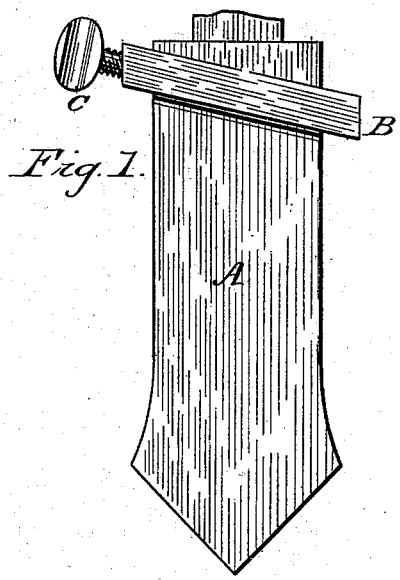
Figure 2:
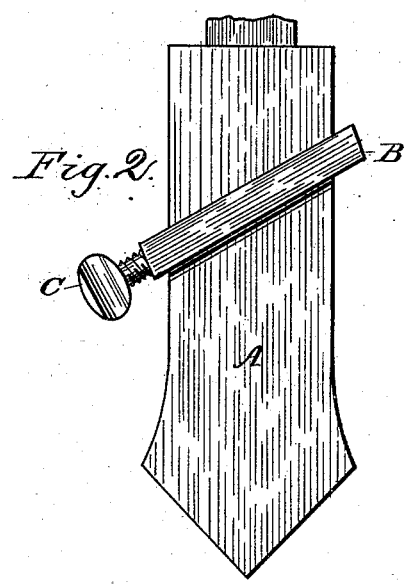
Figure 3:
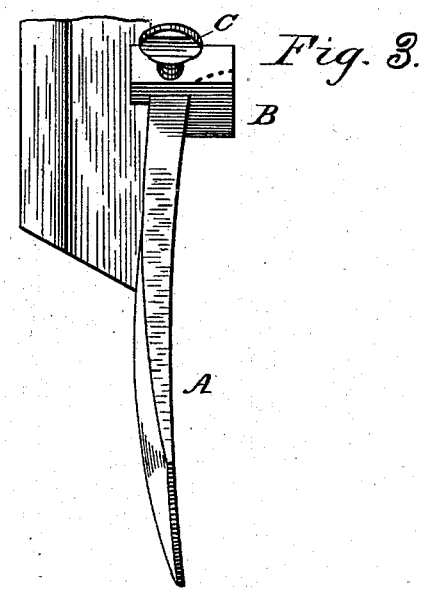
Figure 4:
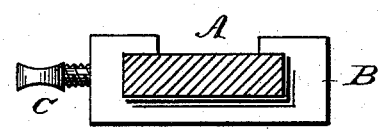

In the accompanying drawings, Figure 1 is a view of a cultivator or plow shovel with our clasp or deflector attached thereto. Fig. 2 is a similar view, showing a lower adjustment of the clasp or deflector. Fig. 3 is a side view of the same, and Fig. 4 is a cross-section thereof.

In carrying out our invention we employ, in connection with a cultivator or plow shovel, A, a clasp or deflector, B. The deflector or clasp B has an oblong opening through it to permit its being slipped upon the shovel, as shown. It is adapted to be arranged thereon obliquely, with its lower end disposed toward or next the young or small corn or plant to deflect or throw the dirt away from the corn or plant, and thus prevent it from covering it while being cultivated. This clasp or deflector has an adjustment or set screw, C, to enable it to be adjusted or set higher or lower, according to the height of the corn or plants it is desired to cultivate.

This device is exceedingly simple, effective, and cheap, and within the reach of all.

The lower surface of the deflector B can be concaved, as shown in dotted lines in Fig. 3, if desired.

We claim and desire to secure by Letters Patent—

The clasp or deflector B, for cultivator or plow shovels, having an adjusting or set screw, C, and adapted to be arranged at an angle with the young or small corn or plants, its lower end being disposed toward the corn or plant, as and for the purpose set forth.

In testimony whereof we affix our signatures in presence of two witnesses.

OWEN McVEY.
GEORGE W. ALBIN.

Witnesses:
JOHN DODELS,
JOHN L. DOUS.